July 29, 1969  YOSHICHIKA KOBAYASHI ET AL  3,458,450
PREPARATION OF BORAX-FLUXED, EUROPIUM-ACTIVATED
RARE EARTH OXIDE PHOSPHORS
Filed Dec. 13, 1965

INVENTORS
Yoshichika Kobayashi
Mutsuo Masuda
Setsuko Murayama
BY
Stevens, Davis, Miller & Mosher
ATTORNEYS

United States Patent Office 3,458,450
Patented July 29, 1969

3,458,450
PREPARATION OF BORAX-FLUXED, EUROPIUM-ACTIVATED RARE EARTH OXIDE PHOSPHORS
Yoshichika Kobayashi, Ibaragi-shi, Mutsuo Masuda, Kyoto, and Setsuko Murayama, Takatsuki-shi, Japan, assignors to Matsushita Electronics Corporation, Osaka, Japan, a corporation of Japan
Filed Dec. 13, 1965, Ser. No. 513,205
Claims priority, application Japan, Dec. 23, 1964, 39/74,207
Int. Cl. C09k 1/10
U.S. Cl. 252—301.4        2 Claims

ABSTRACT OF THE DISCLOSURE

Europium-activated rare earth oxide phosphors having improved color purity and decreased after-glow with good brightness are prepared by heat-treating at about 1100°–1250° C. a mixture consisting essentially of europium, oxide of a rare earth from the group consisting of gadolinium, yttrium and mixtures thereof, and borax, in which the ratio of gram atoms of europium to gram mols of the oxide is between 0.002:1 and 0.3:1 and the ratio of gram mols of borax to gram mols of the oxide is between 0.001:1 and 0.2:1.

---

This invention relates to europium-activated phosphors. An object of the invention is to provide high efficiency phosphors for use in cathode ray tube screens or fluorescent discharge lamps.

Europium-activated rare earth oxide phosphors and methods for preparing them are described, for example, in U.S. Patent 3,250,772.

In general phosphors must be fired at a temperature which is about ⅔ of the absolute temperature of the melting point to get sufficient crystallization within a time of some hours. So gadolinium oxide or yttrium oxide which have melting points of about 2300° C. and 2600° C. respectively should be fired at 1400°–1500° C. It is confirmed experimentally that europium activated gadolinium oxide or yttrium oxide phosphors show high brightness when they are fired at temperatures of about 1400° C. But firing at such a high temperature has many disadvantages. The velocity of crystallization can be increased by adding a chemical additive—hereafter called flux—to the phosphor, prior to the firing. U.S. Patent 3,368,980 describes the preparation of europium-activated yttrium oxide phosphor, wherein an alkaline earth metal halide such as $BaCl_2$, is added to the yttrium oxide component in an amount of 25–400% by weight of the yttrium oxide and the mixture is fired at a temperature of 1100–1500° C. to adjust the grain size of the phosphor.

However, in the preparation of a rare earth oxide phosphor a satisfactory flux should meet the following requirements: (1) accelerate the crystallization of the rare earth oxide at a relatively low firing temperature, (2) effect sufficient diffusion and introduction of europium (activator) into the host crystals, and (3) without quenching the europium fluorescence.

In colour cathode ray tubes fine particles of phosphors decrease the colour purity and give rise to poor adhesion of the colour dots to the screen.

We have found that high efficiency, good particle size distribution and sufficient crystallization of europium activated gadolinium oxide or europium activated yttrium oxide phosphors can be obtained by adding a small quantity of borax as a flux and firing at about 1200° C.

Figure 1:
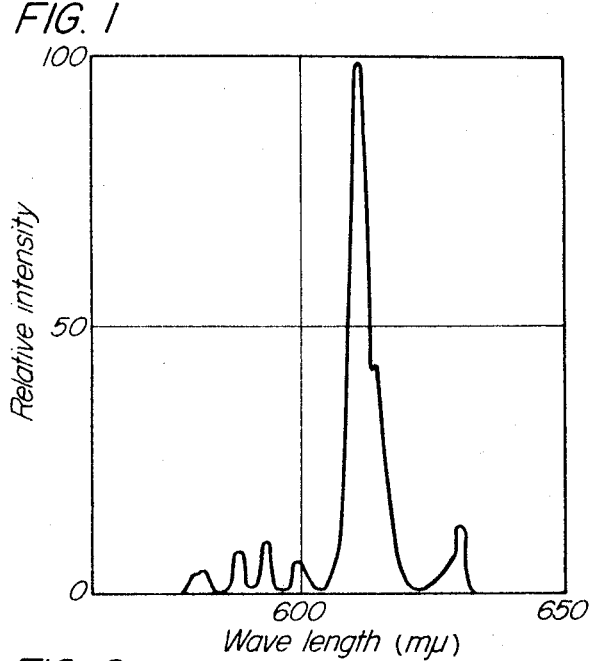
Figure 2:
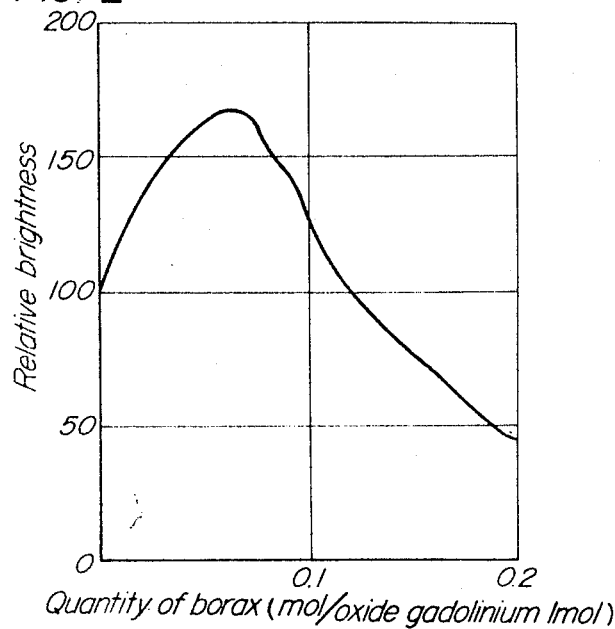

The present invention will be better understood from the following description in connection with the accompanying drawings, in which:

FIGURE 1 is a diagram showing an energy distribution curve of a phosphor of the present invention; and
FIGURE 2 is a diagram showing a curve illustrating a variation in the relative intensity of the brightness with a variation of the quantity of borax which is contained in a phosphor of the present invention.

Europium activated gadolinium oxide or europium activated yttrium oxide phosphors show under 2,537 A. radiation a line emission with a large peak at 6110 A. as shown in FIG. 1. The brightness of these phosphors increases by adding a small quantity of borax before firing. For example the brightness under 2537 A. radiation of europium-activated gadolinium oxide phosphor which contain 5 grams mol percent borax before firing at about 1200° C. is about 170% as compared with the one which contains no borax as shown in FIG. 2. Similar effects are found for europium activated yttrium oxide phosphors. Moreover crystal growth is accelerated and crystallization is improved and by adding borax also the relative amount of fine particles decreases. This improves colour purity and adhesive quality of the powder for application in cathode ray tubes.

The afterglow of the phosphor normally is prolonged by adding a flux, but in the case of borax the afterglow is shortened. This is another big advantage for the use of borax as a flux for phosphors for colour cathode ray tube screens.

Europium-activated gadolinium oxide or europium-activated yttrium oxide phosphors can be fired at 1100°–1250° C. when it contains a small quantity of borax as a flux, resulting in a high efficiency phosphor.

To obtain a good brightness, the ratio of gram atoms of europium to gram mols of gadolinium oxide or yttrium oxide should be between 0.002:1 and 0.3:1 and preferably between 0.04:1 and 0.15:1. To obtain the maximum improvement in brightness, the ratio of gram mols of borax to gram mols of gadolinium oxide or yttrium oxide should be between 0.001:1 and 0.2:1 and preferably between 0.01:1 and 0.1:1.

In the following we give some specific examples for the preparation of europium-activated gadolinium oxide or europium activated yttrium oxide phosphors using borax as a flux.

Example 1

| Raw-mix constituents: | Amounts (gram mols) |
|---|---|
| $Gd_2O_3$ | 1 |
| $Eu_2O_3$ | 0.03 |
| Borax | 0.05 |

The foregoing components are thoroughly mixed and fired at 1150° C. for two hours in air. The phosphors thus prepared show brilliant red emission under 2537 A. ultra-violet ray or under cathode ray excitations.

The emission spectrum by 2537 A. ultra-violet ray excitations is shown in FIG. 1.

Example 2

| Raw-mix constituents: | Amounts (gram mols) |
|---|---|
| $Y_2O_3$ | 1 |
| $Eu_2O_3$ | 0.05 |
| Borax | 0.05 |

The foregoing components are thoroughly mixed and fired at 1150° C. for three hours in air. The phosphors thus prepared show brilliant red emission under 2537 A. ultra-violet ray or under cathode ray excitations.

The emission spectrum by 2537 A. ultra-violet ray excitations is shown in FIG. 1.

Example 3

Raw-mix constituents: Amounts (gram mols)
- $Y_2O_3$ —————————————————— 0.5
- $Gd_2O_3$ —————————————————— 0.5
- $Eu_2O_3$ —————————————————— 0.04
- Borax —————————————————— 0.05

The foregoing components are thoroughly mixed and fired at 1150° C. for two hours in air. The phosphors thus prepared show brilliant red emission under 2537 A. ultra-violet ray or under cathode ray excitations.

The emission spectrum by 2537 A. ultra-violet ray excitations is shown in FIG. 1.

Example 4

Raw-mix constituents: Amounts (gram mols)
- $Gd_2O_3$ —————————————————— 1.0
- $EuF_3$ —————————————————— 0.08
- Borax —————————————————— 0.05

The foregoing components are thoroughly mixed and fired at 1150° C. for two hours in air. The phosphors thus fired show brilliant red emission under 2537 A. ultra-violet ray or under cathode ray excitations.

The emission spectrum by 2537 A. ultra-violet ray excitations is shown in FIG. 1.

Although in the given examples yttrium oxide or gadolinium oxide are used as raw materials, yttrium or gadolinium compounds such as carbonate or oxalate which produce oxide during the firing reaction can be used.

What we claim is:

1. A method for producing an europium-activated phosphor comprising mixing a member selected from the group consisting of yttrium oxide, gadolinium oxide and mixtures thereof, as the host component with europium oxide as an activator in the ratio of 0.002–0.3 mol europium per mol of said host component, adding to the oxide mixture 0.001–0.12 mol of borax per mol of said host as a flux and then firing this mixture at a temperature of 1100–1250° C.

2. The method according to claim 1 in which the mol ratio of europium to the host oxide is between 0.04:1 and 0.15:1 and the ratio of borax to the host oxide is between 0.01:1 and 0.1 to 1.

References Cited

UNITED STATES PATENTS 3,250,722   5/1966   Borchardt ———————— 252—301.4
3,368,980   2/1968   Avella et al. ———————— 252—301.4

TOBIAS E. LEVOW, Primary Examiner

R. D. EDMONDS, Assistant Examiner